US011472294B2

(12) United States Patent
Yoshida et al.

(10) Patent No.: US 11,472,294 B2
(45) Date of Patent: Oct. 18, 2022

(54) BRAKING CONTROL APPARATUS WITH ADJUSTABLE POWER REGENERATION IN ACCORDANCE WITH RELATIVE DISTANCE FROM A PRECEDING VEHICLE

(71) Applicant: SUBARU CORPORATION, Tokyo (JP)

(72) Inventors: Yuki Yoshida, Tokyo (JP); Katsuya Tomiie, Tokyo (JP); Masashi Ban, Tokyo (JP); Makoto Sonoki, Tokyo (JP); Osamu Saito, Tokyo (JP); Yuki Sugimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 360 days.

(21) Appl. No.: 16/688,123

(22) Filed: Nov. 19, 2019

(65) Prior Publication Data

US 2020/0207212 A1 Jul. 2, 2020

(30) Foreign Application Priority Data

Dec. 27, 2018 (JP) .............................. JP2018-244424

(51) Int. Cl.
*B60L 7/18* (2006.01)
*B60K 26/02* (2006.01)
(Continued)

(52) U.S. Cl.
CPC ................ *B60L 7/18* (2013.01); *B60K 26/02* (2013.01); *B60K 31/0008* (2013.01);
(Continued)

(58) Field of Classification Search
CPC ....... B60L 7/18; B60L 2240/64; B60K 26/02; B60K 31/0008; B60K 31/18;
(Continued)

(56) References Cited

U.S. PATENT DOCUMENTS

2016/0167519 A1* 6/2016 Luke ...................... B60L 58/12
701/22
2017/0015212 A1* 1/2017 Mitsuoka .......... B60W 50/0097
(Continued)

FOREIGN PATENT DOCUMENTS

JP 2006204072 A * 8/2006
JP 2017-22911 1/2017
(Continued)

OTHER PUBLICATIONS

Annotated English translation of Sugimoto (JP-2006204072) (Year: 2006).*
(Continued)

*Primary Examiner* — James M McPherson
*Assistant Examiner* — Kyle J Kingsland
(74) *Attorney, Agent, or Firm* — Smith, Gambrell & Russell, LLP (57) ABSTRACT

A braking control apparatus to be installed an electric vehicle includes an acceleration and deceleration operation member, a controller, and a recognizer. The acceleration and deceleration operation member receives an acceleration request in accordance with an operation amount in a first direction from a neutral position, and receive a deceleration request in accordance with an operation amount in a second direction from the neutral position. The controller controls an amount of power regenerated by a rotary electric machine driven by wheels in accordance with the operation amount in the second direction. The recognizer recognizes a preceding vehicle traveling ahead of the electric vehicle. Upon detection of the preceding vehicle at a relative distance from the electric vehicle that is equal to or less than a threshold, the controller performs braking suppression control to decrease the amount of power regenerated in accordance with the operation amount in the second direction.

16 Claims, 6 Drawing Sheets

(51) Int. Cl.
*B60K 31/00* (2006.01)
*B60T 17/22* (2006.01)
*B60K 31/18* (2006.01)

(52) U.S. Cl.
CPC .............. *B60K 31/18* (2013.01); *B60T 17/22* (2013.01); *B60K 2026/025* (2013.01); *B60K 2031/0025* (2013.01); *B60K 2031/0033* (2013.01); *B60T 2201/02* (2013.01); *B60T 2201/022* (2013.01); *B60T 2210/12* (2013.01); *B60T 2210/32* (2013.01); *B60T 2250/04* (2013.01); *B60T 2270/60* (2013.01)

(58) Field of Classification Search
CPC ...... B60K 2026/025; B60K 2031/0025; B60K 2031/0033; B60T 17/22; B60T 2201/02; B60T 2201/022; B60T 2210/12; B60T 2210/32; B60T 2250/04; B60T 2270/60
See application file for complete search history.

(56) References Cited

U.S. PATENT DOCUMENTS

2018/0043896 A1\* 2/2018 Lee .......................... B60T 7/18
2018/0362047 A1\* 12/2018 Hagawa ................ B60W 10/20

FOREIGN PATENT DOCUMENTS

WO    WO-2013133177 A1 \* 9/2013 .............. B60L 3/108
WO    WO-2016092586 A1 \* 6/2016 ............ B60W 10/08

OTHER PUBLICATIONS

Annotated English translation of Shiozawa (WO-2016092586) (Year: 2016).\*

\* cited by examiner

BRAKING CONTROL APPARATUS WITH ADJUSTABLE POWER REGENERATION IN ACCORDANCE WITH RELATIVE DISTANCE FROM A PRECEDING VEHICLE

CROSS-REFERENCE TO RELATED APPLICATIONS

The present application claims priority from Japanese Patent Application No. 2018-244424 filed on Dec. 27, 2018, the entire contents of which are hereby incorporated by reference.

BACKGROUND

The disclosure relates to a braking control apparatus for an electric vehicle that enables an identical operation member to implement acceleration operation and deceleration operation.

Regarding an electric vehicle such as an electric automobile, it is known that when a driver returns the accelerator pedal to perform acceleration operation of the vehicle, slow braking is performed with a regenerative brake so that operation of the single pedal enables acceleration operation and deceleration operation (what is called one-pedal control).

A technique of related art relating to an electric vehicle in which power regeneration is performed when the accelerator pedal is released is disclosed in, for example, Japanese Unexamined Patent Application Publication No. 2017-22911. This technique includes a regeneration forbidden mode in which no power regeneration is performed while the vehicle is coasting with the accelerator pedal released. A period of time of continuation of a coasting state in the regeneration forbidden mode is estimated in accordance with an inter-vehicle distance between the host vehicle and a preceding vehicle. When the coasting state in the regeneration forbidden mode is continued for a predetermined period of time or longer, the inverter is shut down.

SUMMARY

An aspect of the disclosure provides a braking control apparatus to be installed in an electric vehicle. The apparatus includes an acceleration and deceleration operation member, a controller, and a recognizer. The acceleration and deceleration operation member is configured to receive an acceleration request in accordance with an operation amount of the acceleration and deceleration operation member in a first direction from a neutral position. The acceleration and deceleration operation member is configured to receive a deceleration request in accordance with an operation amount of the acceleration and deceleration operation member in a second direction from the neutral position. The controller is configured to control an amount of power regenerated by a rotary electric machine driven by wheels in accordance with the operation amount of the acceleration and deceleration operation member in the second direction. The recognizer is configured to recognize a preceding vehicle traveling ahead of the electric vehicle. Upon detection of the preceding vehicle at a relative distance from the electric vehicle that is equal to or less than a braking suppression threshold, the controller performs braking suppression control to decrease the amount of power regenerated in accordance with the operation amount of the acceleration and deceleration operation member in the second direction.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Some vehicles perform acceleration and deceleration control using a single operation member such as an accelerator pedal. When a driver of such a vehicle is intending to follow a preceding vehicle during low-speed traveling in a traffic jam, for example, a deceleration at the time of catching up with the preceding vehicle and returning the accelerator pedal may become excessively sharp. This may make smooth speed control difficult and degrade drivability (ease of driving) in some cases.

It is desirable to provide a braking control apparatus for a vehicle that performs acceleration operation and deceleration operation using a single operation member, which apparatus facilitates following travel of the vehicle behind another vehicle.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

First Embodiment

A description will be hereinafter made on a braking control apparatus according to a first embodiment of the disclosure.

The braking control apparatus according to the first embodiment is installed in, for example, an electric vehicle (pure EV) such as a passenger automobile. The braking control apparatus uses an accelerator pedal that receives an acceleration request, so as to function to control a regenerative brake by a motor generator as a traveling motor.

Figure 1:
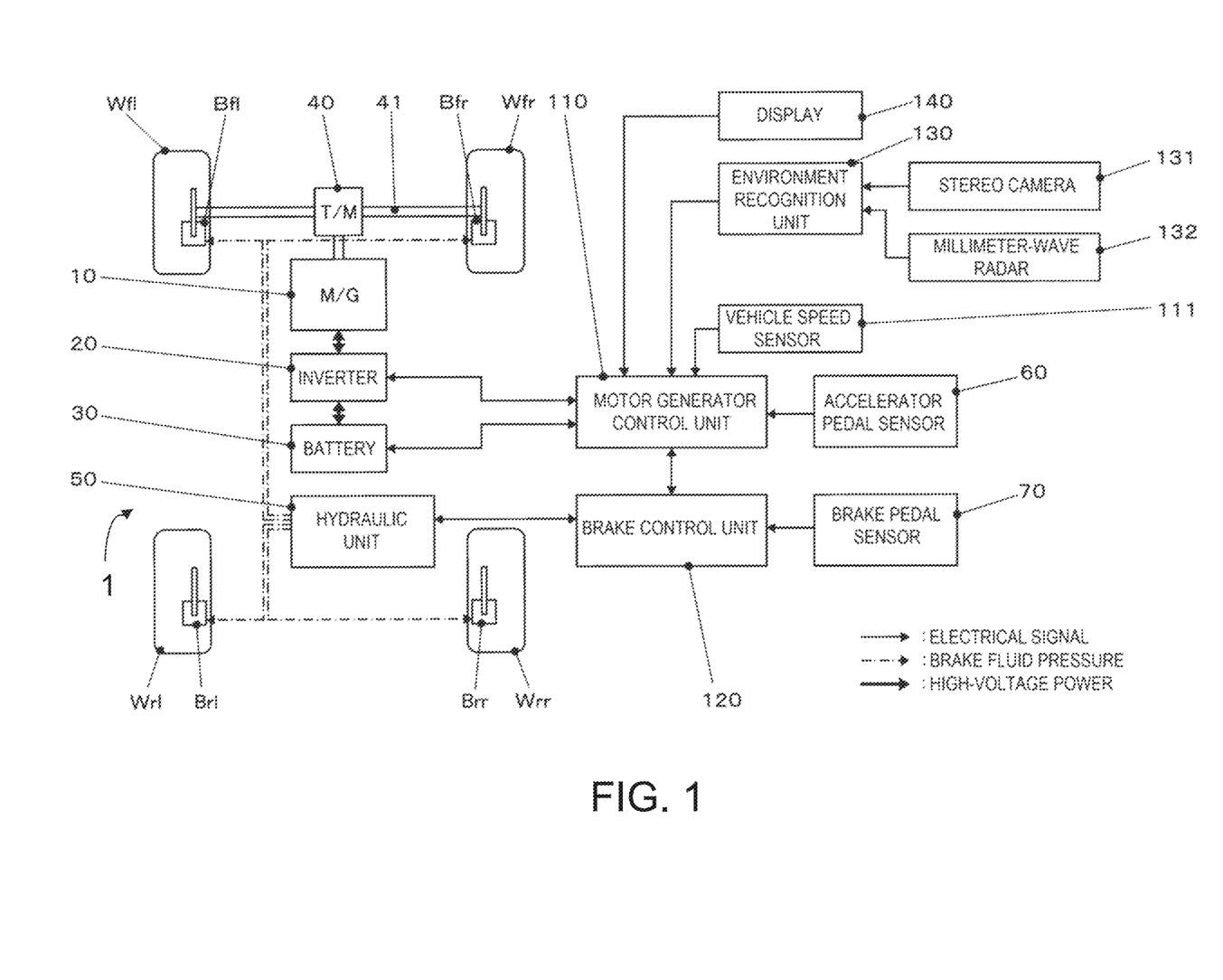
FIG. 1 is a block diagram illustrating a configuration of a vehicle including a braking control apparatus according to a first embodiment of the disclosure.

FIG. 1 is a block diagram illustrating a configuration of the vehicle including the braking control apparatus according to the first embodiment.

A vehicle 1 is, for example, a four-wheel passenger automobile including a left front wheel Wfl, a right front wheel Wfr, a left rear wheel Wrl, and a right rear wheel Wrr.

The wheels are rotatably supported by hubs, not illustrated, respectively provided with a left front wheel brake Bfl, a right front wheel brake Bfr, a left rear wheel brake Brl, and a right rear wheel brake Brr, which are hydraulic service brakes.

The vehicle 1 includes, for example, a motor generator 10, an inverter 20, a battery 30, a transmission 40, a hydraulic unit 50, an accelerator pedal sensor 60, a brake pedal sensor 70, a motor generator control unit 110, a brake control unit 120, an environment recognition unit 130, and a display 140.

The motor generator 10 is a rotary electric machine (that is, a traveling motor) used as a traveling power source for the vehicle 1.

As an example of the motor generator 10, a permanent magnet synchronous electric motor may be used.

When power is supplied from the Inverter 20, the motor generator 10 generates torque for driving the vehicle 1.

Also, the motor generator 10 absorbs torque input from the wheels to perform power regeneration, and charges the battery 30 and generates braking force as a regenerative brake.

The inverter 20 converts DC power output from the battery 30 into AC power and supplies the AC power to the motor generator 10.

In power regeneration by the motor generator 10, the inverter 20 converts AC power output from the motor generator 10 into DC power to charge the battery 30.

The battery 30 is a secondary battery to store power used for traveling of the vehicle 1, for example.

The battery 30 is, for example, a battery pack containing in a container a plurality of lithium ion battery cells connected in series and in parallel.

The battery 30 includes an ECU and a cooling device. The ECU monitors, for example, a voltage of each cell, input and output voltages to and from the battery, a remaining capacity (state of charge or SOC) of the battery, and a temperature of the battery.

The transmission 40 is a power transmission mechanism to transmit the output from the motor generator 10 to drive wheels, namely, the left front wheel Wfl and the right front wheel Wfr (when the vehicle 1 is a front wheel drive vehicle).

The transmission 40 includes a deceleration mechanism and a differential mechanism. The deceleration mechanism decreases a rotational speed of the output shaft of the motor generator 10. The differential mechanism transmits driving force to the left front wheel Wfl and the right front wheel Wfr and absorbs a rotational speed difference during a turn.

The differential mechanism is coupled to the left front wheel Wfl and the right front wheel Wfr with a drive shaft 41.

In power regeneration by the motor generator 10, the transmission 40 transmits driving force input from the left front wheel Wfl and the right front wheel Wfr via the drive shafts 41 to the motor generator 10.

The hydraulic unit 50 individually regulates brake fluid pressures supplied to wheel cylinders of the left front wheel brake Bfl, the right front wheel brake Bfr, the left rear wheel brake Brl, and the right rear wheel brake Brr so as to control braking force of the respective wheels by the hydraulic service brakes.

The hydraulic unit 50 includes, for example, a motor pump to pressurize brake fluid, and solenoid valves, such as a pressurizing valve, a pressure holding valve, and a pressure reducing valve, to regulate the fluid pressures.

When brake cooperative control by the motor generator control unit 110 and the brake control unit 120 uses braking force by the hydraulic service brakes, the hydraulic unit 50 applies intended brake fluid pressures to the wheel cylinders.

For example, when a deceleration is too high to obtain intended braking force from the regenerative brake or immediately before the vehicle 1 comes to a stop, the hydraulic service brakes are used.

The hydraulic unit 50 is also used for anti-lock brake control and vehicle behavior control.

When the wheels are locked by braking, the anti-lock brake control intermittently decreases braking force to recover rotation of the wheels.

When understeering or oversteering behavior occurs, the vehicle behavior control causes the left and right wheels to have a braking force difference to generate yaw moment in a direction to suppress such behavior.

The accelerator pedal sensor 60 detects an operation amount (for example, a depression amount) of an accelerator pedal AP (see FIG. 2) through which a driver inputs an acceleration operation and a slow deceleration operation.

An output of the accelerator pedal sensor 60 is transmitted to the motor generator control unit 110.

The brake pedal sensor 70 detects an operation amount (for example, a depression amount) of a brake pedal, not illustrated, through which the driver inputs a deceleration operation.

An output of the brake pedal sensor 70 is transmitted to the brake control unit 120.

The motor generator control unit 110 controls the output of the motor generator 10 in driving the motor generator 10 and also controls an amount of generated power (braking force of the regenerative brake and the deceleration of the vehicle 1) during power regeneration by the motor generator 10.

In one embodiment, the motor generator control unit 110 in cooperation with the brake control unit 120 may serve as a "controller".

The output, of the motor generator 10 during power traveling such as acceleration and constant-speed traveling is set in accordance with the operation amount of the accelerator pedal AP detected by the accelerator pedal sensor 60, for example, when the vehicle 1 is operated by the driver (that is, the vehicle 1 is operated neither by self-driving nor using adaptive cruise control).

The amount of generated power by the motor generator 10 (braking force of the regenerative brake) during power regeneration is set in accordance with (i) an operation amount of the accelerator pedal AP at a stroke initial stage (a depression initial stage) detected by the accelerator pedal sensor 60, and (ii) braking force demanded by the brake control unit 120.

Figure 2:
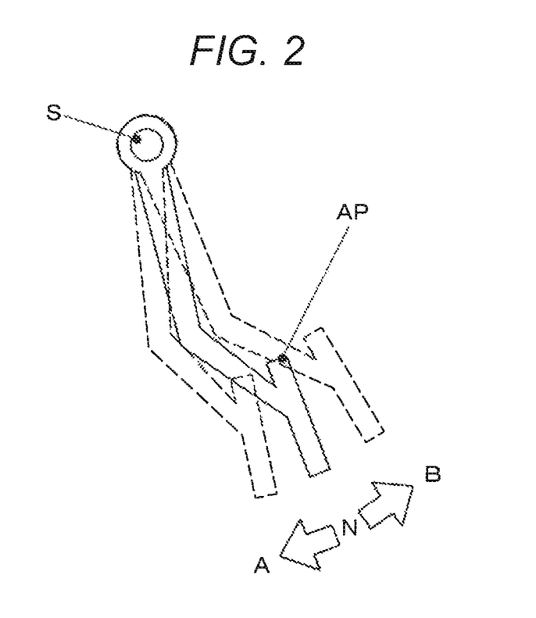
FIG. 2 is a schematic diagram illustrating a function of an accelerator pedal of the vehicle including the braking control apparatus according to the first embodiment.

FIG. 2 is a schematic diagram illustrating a function of the accelerator pedal AP of the vehicle 1 including the braking control apparatus according to the first embodiment.

In one embodiment, the accelerator pedal AP may serve as an "acceleration and deceleration operation member".

FIG. 2 is a side view of the accelerator pedal AP, as viewed from the left side in the vehicle width direction.

The accelerator pedal AP is swingable about a shaft S extending in the vehicle width direction. The accelerator pedal AP is urged counterclockwise (in a return direction) in FIG. 2 by a return spring, not illustrated.

The driver operates the accelerator pedal AP by depressing a lower end of the accelerator pedal AP against resistance force of the return spring by his/her foot in such a direction that the lower end moves from the right to the left in FIG. 2.

The accelerator pedal AP has a neutral position N in an intermediate portion of a movable range (stroke).

The driver depresses the accelerator pedal AP clockwise in FIG. 2 from the neutral position N to perform acceleration operation (accelerator operation and input of an acceleration request).

The motor generator control unit 110 increases output torque of the motor generator 10 in accordance with an increase in the operation amount of the accelerator pedal AP clockwise (in a direction A) in FIG. 2 from the neutral position N.

Moreover, the accelerator pedal AP has what is called a one-pedal control function that enables braking operation (brake operation and input of a deceleration request) in accordance with an operation amount of the accelerator pedal AP counterclockwise (in a direction B, i.e., the return direction) in FIG. 2 from the neutral position N.

The motor generator control unit 110 controls an amount of power regenerated by the motor generator 10 to obtain target braking force, which is set by multiplying the operation amount of the accelerator pedal AP in the direction B from the neutral position N by a predetermined braking force gain.

A setting of the braking force gain will be detailed later.

The brake control unit 120 in cooperation with the motor generator control unit 110 cooperatively controls the hydraulic service brakes and the regenerative brake by the motor generator 10 so as to obtain braking force in accordance with the operation amount detected by the brake pedal sensor 70.

The motor generator control unit 110 and the brake control unit 120 each includes, for example, an information processing unit such as CPU, a storage unit such as RAM and ROM, an input/output interface, and a bus interconnecting these components.

The motor generator control unit 110 and the brake control unit 120 are mutually communicable via in-vehicle LAN such as a CAN communication system or through direct connection.

The motor generator control unit 110 is capable of obtaining an output of a vehicle speed sensor 111.

The vehicle speed sensor 111 is disposed on, for example, the hub of each wheel and outputs a vehicle speed signal in accordance with rotation of the wheel.

The motor generator control unit 110 is capable of calculating a traveling speed (vehicle speed) of the vehicle 1 based on the output of the vehicle speed sensor 111.

In accordance with a target deceleration (target braking force) set based on the output of the brake pedal sensor 70, the brake control unit 120 distributes target braking force of the regenerative brake by power regeneration of the motor generator 10 and target braking force of the hydraulic service brakes, and requests the target braking force of the regenerative brake to the motor generator control unit 110.

In accordance with the target braking force of the hydraulic service brakes, the brake control unit 120 sets target brake fluid pressures of the wheel cylinders of the wheel brakes Bfl, Bfr, Brl, and Brr, and controls the hydraulic unit 50 to make actual brake fluid pressures coincide with the target values.

The environment recognition unit 130 recognizes an environment of the host vehicle and functions, for example, to detect a preceding vehicle traveling ahead of the host vehicle and sequentially detect a relative position of the detected preceding vehicle relative to the host vehicle.

In one embodiment, the environment recognition unit 130 may serve as a "recognizer".

A stereo camera 131, a millimeter-wave radar 132, and other components are coupled to the environment recognition unit 130.

The stereo camera 131 includes a pair of color imaging devices (cameras) that are disposed, for example, inside of the windshield at the front of a vehicle cabin, not illustrated, of the vehicle 1 and that face ahead of the vehicle 1. The pair of color imaging devices are separated from each other by a predetermined base line length in the vehicle width direction.

Each of the imaging devices includes, for example, a solid-state imaging device such as CMOS and its drive device, an optical system including a lens group to form an image of a front view from the host vehicle on an imaging plane, and an image processor to process an output signal from the solid-state imaging device and generate image data.

The stereo camera 131 includes an image processor to subject image data sequentially transmitted from the left and right imaging devices to known stereo image processing, recognize an object ahead of the host vehicle, and detect a relative position of the recognized object relative to the host vehicle using, for example, pixel positions on the image and a parallax of the left and right imaging devices.

A millimeter-wave radar of the 24 GHz band or 77 GHz band, for example, is used for the millimeter-wave radar 132 to detect an object around the host vehicle and determine a relative position and a relative speed of the detected object (such as a preceding vehicle) relative to the host vehicle.

Based on information from the stereo camera 131 and the millimeter-wave radar 132, the environment recognition unit 130 detects presence of another vehicle (a preceding vehicle) ahead of the host vehicle. When a preceding vehicle is present, the environment recognition unit 130 detects a relative position of the preceding vehicle relative to the host vehicle.

The environment recognition unit 130 is capable of calculating a relative speed of the preceding vehicle relative to the host vehicle based on a history of relative positions of the preceding vehicle relative to the host vehicle.

Furthermore, the environment recognition unit 130 is capable of calculating a speed of the preceding vehicle based on information regarding, for example, the calculated relative speed of the preceding vehicle relative to the host vehicle and the vehicle speed of the host vehicle obtained from the motor generator control unit 110.

The environment recognition unit 130 also functions to detect a low-μ state in which a road surface being covered by the host vehicle has a low friction coefficient μ with respect to a normal dry paved road.

Examples of the low-μ state include a wet state in which the road surface is wet and an icebound and/or snowbound state in which the road surface is frozen and/or covered with snow.

The environment recognition unit 130 detects the low-μ state based on, for example, reflection of the road surface in the image captured by the stereo camera 131.

The display 140 displays various kinds of information including, for example, images and text data to the driver and other occupants.

The display 140 includes, for example, an instrument panel at the front of the vehicle cabin and an LCD disposed in a combination meter.

In one embodiment, the display 140 may serve as a "notifier".

A more specific description will now be made on control of the regenerative brake by the accelerator pedal in the braking control apparatus according to the first embodiment.

Figure 3:
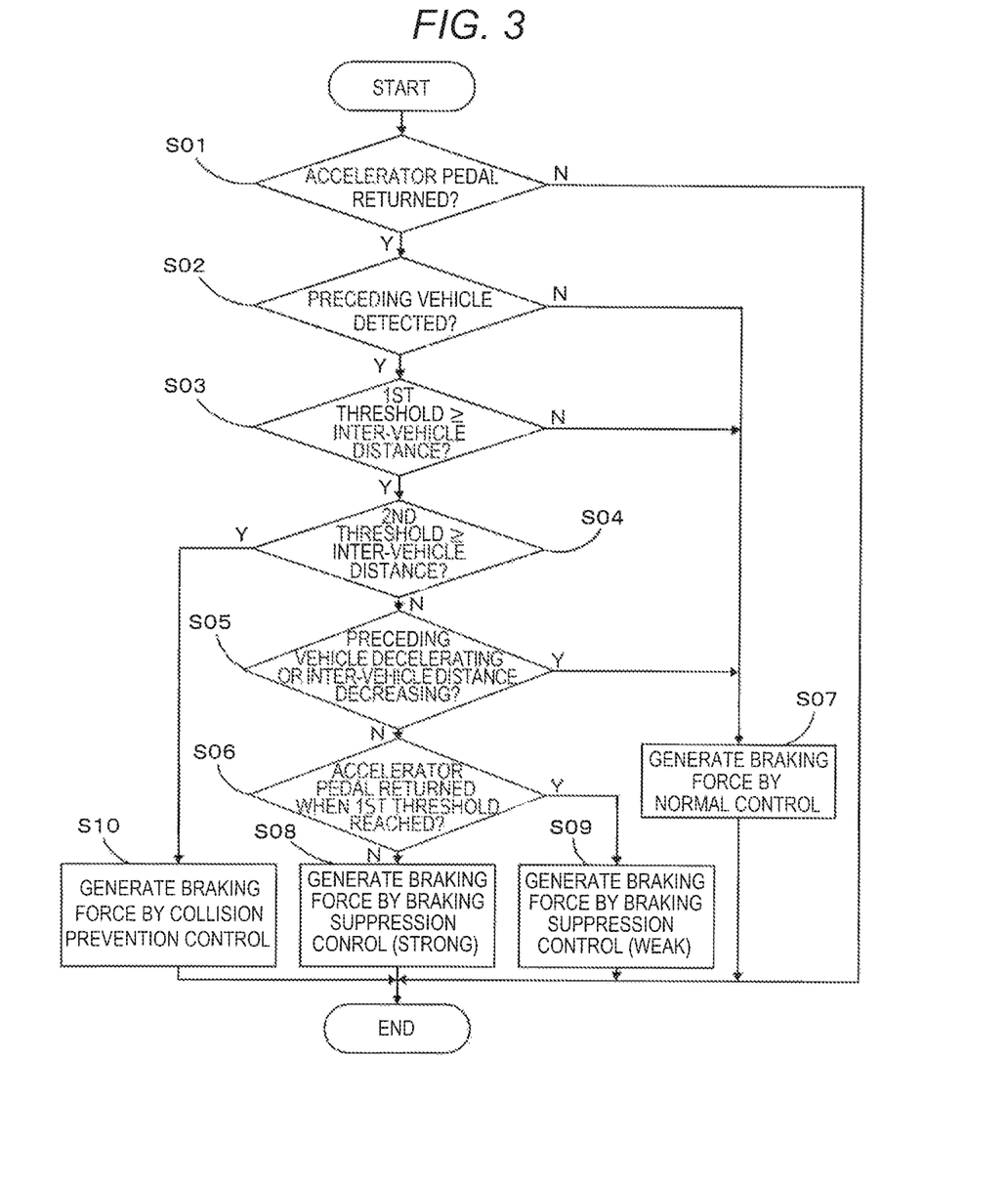
FIG. 3 is a flowchart illustrating braking force control by the accelerator pedal in the braking control apparatus according to the first embodiment.

FIG. 3 is a flowchart illustrating braking force control by the accelerator pedal in the braking control apparatus according to the first embodiment.

The braking force control will be described in sequence step by step below.

[Step S01: Determine Whether Accelerator Pedal has been Returned]

Based on an output of the accelerator pedal sensor 60, the motor generator control unit 110 determines whether a position of the accelerator pedal AP (an operation amount by the driver) is on a return side (the direction B side) of the neutral position N.

When the position of the accelerator pedal AP is on the return side of the neutral position N, the motor generator control unit 110 obtains information regarding a return amount (an amount of displacement in the direction B) from the neutral position N based on the output of the accelerator pedal sensor 60, and proceeds to step S02. Otherwise, the motor generator control unit 110 ends the series of processes (to return).

[Step S02: Determine Whether Preceding Vehicle has Been Detected]

Based on information from the environment recognition unit 130, the motor generator control unit 110 determines whether another vehicle (a preceding vehicle) is ahead of the host vehicle.

For example, when a vehicle is traveling the same lane as the host vehicle ahead of the host vehicle in an identical direction, the vehicle may be recognized as a preceding vehicle.

When a preceding vehicle is detected, the motor generator control unit 110 proceeds to step S03. Otherwise, the motor generator control unit 110 proceeds to step S07.

[Step S03: Compare Inter-Vehicle Distance with First Threshold]

The motor generator control unit 110 compares a relative distance (inter-vehicle distance) of the preceding vehicle detected at step S02 from the host vehicle with a first threshold.

In one embodiment, the first threshold may serve as a "braking suppression threshold".

The first threshold may be set at approximately 10 m to 20 m, for example, and made to increase as the vehicle speed increases. This setting will be described in detail later.

When the inter-vehicle distance is equal to or less than the first threshold, the motor generator control unit 110 proceeds to step S04. Otherwise, the motor generator control unit 110 proceeds to step S07.

[Step S04: Compare Inter-Vehicle Distance with Second Threshold]

The motor generator control unit 110 compares the inter-vehicle distance of the preceding vehicle detected at step S02 from the host vehicle with a second threshold.

In one embodiment, the second threshold may serve as a "collision prevention threshold".

The second threshold may be made less than the first threshold and set at approximately 5 m, for example.

When the inter-vehicle distance is equal to or less than the second threshold, the motor generator control unit 110 proceeds to step S10. Otherwise, the motor generator control unit 110 proceeds to step S05.

[Step S05: Determine Whether Preceding Vehicle is Decelerating or in Inter-Vehicle Distance Decreasing State]

Based on information from the environment recognition unit 130, the motor generator control unit 110 determines whether the preceding vehicle detected at step S02 is in a decelerating state or in an inter-vehicle distance decreasing state in which the inter-vehicle distance from the host vehicle is decreasing.

For example, the motor generator control unit 110 may determine that the preceding vehicle is in the decelerating state in the following cases:
when the vehicle speed of the preceding vehicle calculated by the environment recognition unit 130 is decreasing at a change rate equal to or higher than a predetermined value; and
when it is detected that a brake lamp of the preceding vehicle is lit in an image captured by the stereo camera 131.

The motor generator control unit 110 determines that the preceding vehicle is in the inter-vehicle distance decreasing state when the relative position of the preceding vehicle relative to the host vehicle that has been detected by the environment recognition unit 130 is approaching the host vehicle at a speed equal to or higher than a predetermined value.

When at least one of the decelerating state or the inter-vehicle distance decreasing state of the preceding vehicle is detected, the motor generator control unit 110 forbids braking suppression control and proceeds to step S07. Otherwise, the motor generator control unit 110 proceeds to step S06.

[Step S06: Determine State of Accelerator Pedal when the First Threshold has been Reached]

When the latest inter-vehicle distance to the preceding vehicle changes from being longer than the first threshold to being equal to or less than the first threshold, the motor generator control unit 110 determines whether the accelerator pedal AP has been returned from the neutral position N (displaced in the direction B), that, is, whether the driver has performed braking operation.

When the inter-vehicle distance becomes equal to or less than the first threshold and when the accelerator pedal AP has not been returned from the neutral position N (when the host vehicle is accelerating or coasting), the motor generator control unit 110 proceeds to step S08. When the accelerator pedal AP has been returned from the neutral position N and when the inter-vehicle distance has passed the first threshold (when the host vehicle is decelerating), the motor generator control unit 110 proceeds to step S09.

[Step S07: Generate Braking Force by Normal Control]

The motor generator control unit 110 controls the amount of power regenerated by the motor generator 10 to cause the regenerative brake to provide braking force, which is the product of a current position of the accelerator pedal AP (an amount of displacement from the neutral position N in the direction B) detected by the accelerator pedal sensor 60 and a predetermined braking force gain.

Thereafter, the motor generator control unit 110 ends the series of processes.

[Step S08: Generate Braking Force by Braking Suppression Control (Strong)]

The motor generator control unit 110 controls the amount of power regenerated by the motor generator 10 to cause the regenerative brake to provide braking force, which is the product of a current position of the accelerator pedal AP (an amount of displacement from the neutral position N in the direction B) detected by the accelerator pedal sensor 60 and the braking force gain set at a value less than at the time of normal control, as described later.

At the time of performing the braking suppression control, the display 140 displays to the driver and other occupants a character and a pattern, for example, indicating that the braking suppression control is being performed.

Thereafter, the motor generator control unit 110 ends the series of processes (to return).

A change in the braking force gain upon intervention by the braking suppression control will be described below.

Figure 4:
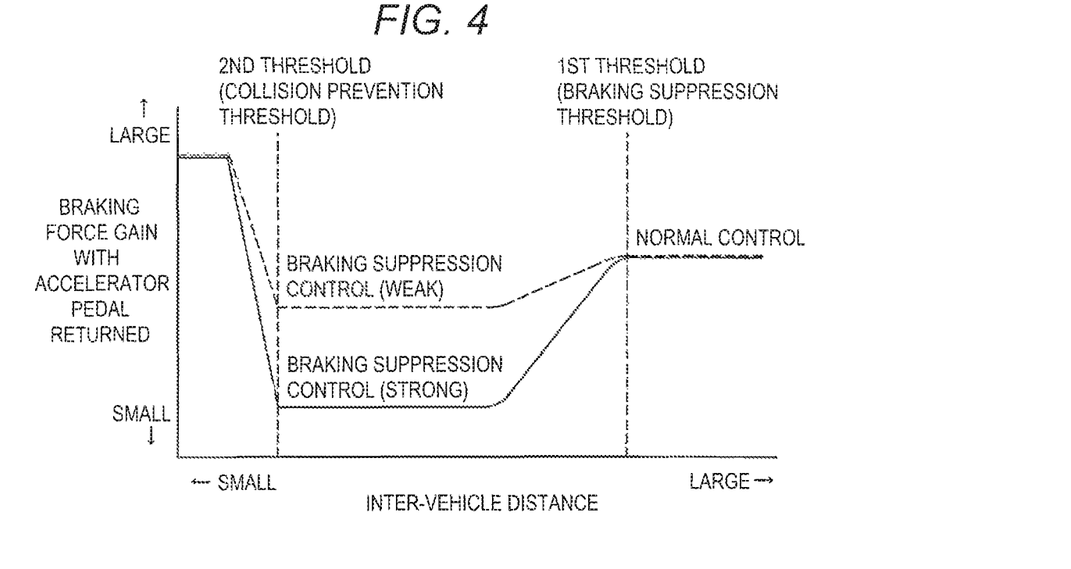
FIG. 4 is a graph schematically illustrating a correlation between an inter-vehicle distance to a preceding vehicle and a braking force gain in the braking control apparatus according to the first embodiment.

FIG. 4 is a graph schematically illustrating a correlation between the inter-vehicle distance to the preceding vehicle and the braking force gain in the braking control apparatus according to the first embodiment.

In FIG. 4, the horizontal axis represents the inter-vehicle distance between the host vehicle and the preceding vehicle whereas the vertical axis represents the braking force gain (the same applies to FIGS. 5 and 6, described later).

A transition of the braking force gain exhibits substantially the same tendency as braking force and deceleration when a return amount of the accelerator pedal AP is constant.

In FIG. 4, a transition of the braking force gain in braking suppression control (strong) is indicated with the solid line.

When the inter-vehicle distance becomes equal to or less than the first threshold, the braking force gain decreases in accordance with a decrease in the inter-vehicle distance.

With the inter-vehicle distance being in a range close to the first threshold, a decrease rate (an inclination in FIG. 4) of the braking force gain with respect to the change in the inter-vehicle distance gradually increases as the inter-vehicle distance decreases. As a result, a segment of the solid line indicating the braking force gain is quadratically curved to protrude upward (with the inclination gradually increasing).

When the inter-vehicle distance further decreases, the braking force gain decreases in proportion to the decrease in the inter-vehicle distance. A segment of the solid line indicating the braking force gain is a straight line inclined, as indicated in FIG. 4.

When the inter-vehicle distance even further decreases and when the braking force gain reaches a preset lower limit value (a constant value), the braking force gain remains at the constant value in a range of shorter inter-vehicle distances until the inter-vehicle distance becomes equal to or less than the second threshold.

In order to obtain braking force, which is the product of this braking force gain and a return amount of the accelerator pedal AP, the motor generator control unit 110 controls the amount of power regenerated by the motor generator 10.

The braking force gain varies in accordance with a road surface situation recognized by the environment recognition unit 130.

Figure 5:
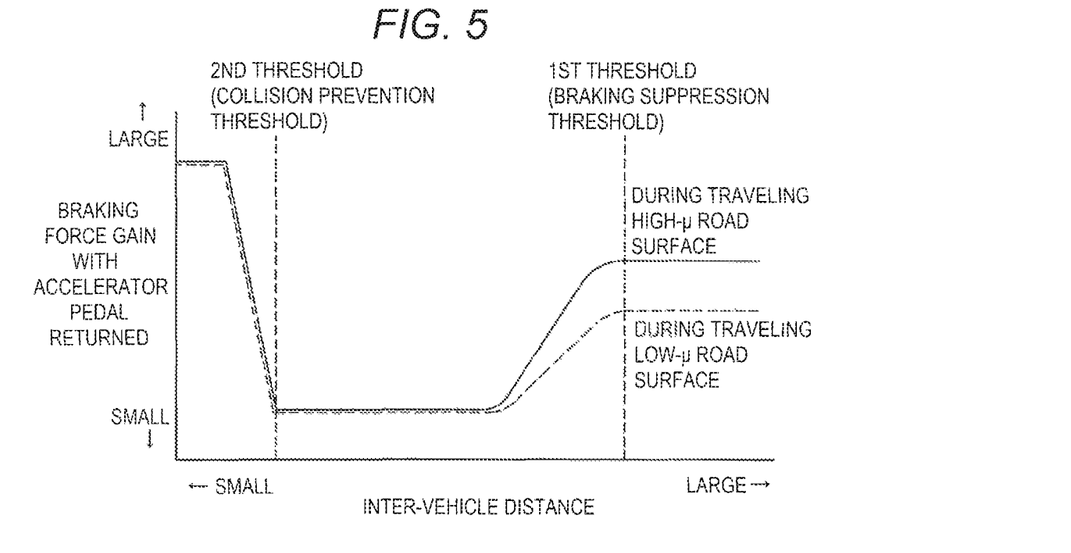
FIG. 5 is a graph illustrating a change in the correlation between the inter-vehicle distance to the preceding vehicle and the braking force gain when a road surface friction coefficient changes in the braking control apparatus according to the first embodiment.

FIG. 5 is a graph illustrating a change in the correlation between the inter-vehicle distance to the preceding vehicle and the braking force gain when a road surface friction coefficient changes in the braking control apparatus according to the first embodiment.

In the case of traveling a low-μ road surface such as a wet road surface as indicated with the dashed line in FIG. 5, as compared with the case of traveling a high-μ road surface as indicated with the solid line, the braking force gain at the time of normal control is set at a low value in advance and set in such a manner that a decrease rate (an inclination in FIG. 5) of the braking force gain decreases relative to a change in the inter-vehicle distance when the inter-vehicle distance becomes equal to or less than the first threshold.

In an example illustrated in FIG. 5, lower limit values of the braking force gain during traveling a high-μ road surface and during traveling a low-μ road surface are made substantially the same. However, the lower limit values may be made different from each other.

The braking force gain, the first threshold, and the second threshold vary in accordance with the vehicle speed of the host vehicle.

Figure 6:
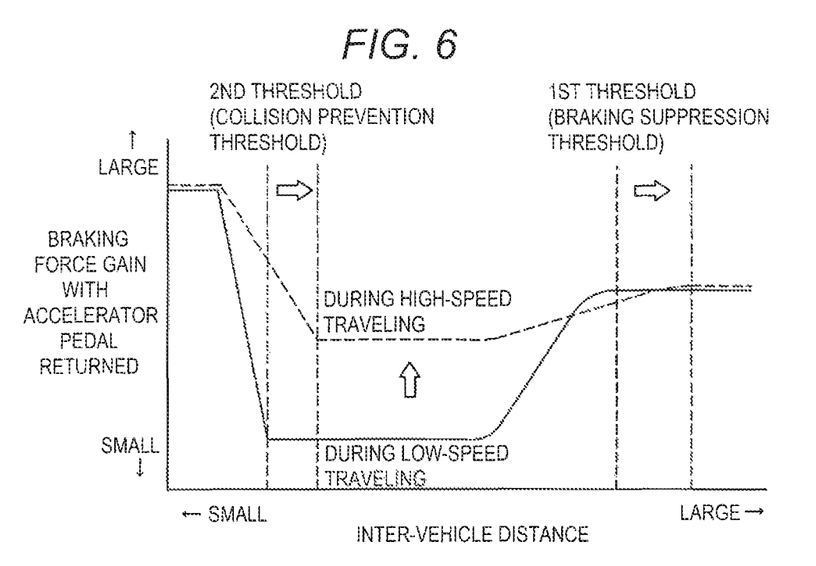
FIG. 6 is a graph illustrating a change in the correlation between the inter-vehicle distance to the preceding vehicle and the braking force gain when a vehicle speed changes in the braking control apparatus according to the first embodiment.

FIG. 6 is a graph illustrating a change in the correlation between the inter-vehicle distance to the preceding vehicle and the braking force gain when the vehicle speed changes in the braking control apparatus according to the first embodiment.

As illustrated in FIG. 6, both of the first threshold and the second threshold are set to increase as the vehicle speed of the host vehicle increases.

A lower limit value of the braking force gain is set to increase as the vehicle speed increases.

As a result, a decrease rate (an inclination in FIG. 6) of the braking force gain when the inter-vehicle distance becomes equal to or less than the first threshold and further decreases is lower during high-speed traveling than during low-speed traveling.

[Step S09 Generate Braking Force by Braking Suppression Control (Weak)]

The motor generator control unit 110 controls the amount of power regenerated by the motor generator 10 to cause the regenerative brake to provide braking force, which is the product of a current position of the accelerator pedal AP (an amount of displacement from the neutral position N in the direction B) detected by the accelerator pedal sensor 60 and the braking force gain indicated with the dashed line in FIG. 4.

As illustrated in FIG. 4, in braking suppression control (weak), as compared with the above-described braking suppression control (strong), a lower limit value of the braking force gain is set at a larger value, and a decrease rate (an inclination in FIG. 4) of the braking force gain when the inter-vehicle distance decreases from the range close to the first threshold is suppressed to prevent the driver from feeling uneasy or alarmed due to the braking force abruptly lessened.

Thereafter, the motor generator control unit 110 ends the series of processes (to return).

[Step S10: Generate Braking Force by Collision Prevention Control]

The motor generator control unit 110 performs collision prevention control to control the amount of power regenerated by the motor generator 10 to cause the regenerative brake to provide braking force, which is the product of a current position of the accelerator pedal AP (an amount of displacement from the neutral position N in the direction B) detected by the accelerator pedal sensor 60 and a braking force gain set at a value larger than at the time of normal control and braking suppression control, as described later.

Thereafter, the motor generator control unit 110 ends the series of processes.

As illustrated in FIGS. 4 to 6, when the inter-vehicle distance becomes equal to or less than the second threshold, the braking force gain sharply increases as the inter-vehicle distance decreases. When reaching a preset upper limit value, the braking force gain maintains the upper limit value irrespective of the inter-vehicle distance.

The upper limit value of the braking force gain is set at a larger value than the braking force gain at the time of normal control.

Thus, insofar as the driver keeps the accelerator pedal AP returned, the braking force by the regenerative brake sharply rises responsively when the inter-vehicle distance becomes equal to or less than the second threshold.

According to the first embodiment described above, the following effects can be obtained.

(1) When the inter-vehicle distance between the host vehicle and the preceding vehicle becomes equal to or less than the first threshold, the amount of power regenerated in accordance with the amount of operation of the accelerator pedal AP in the direction B is reduced to lessen effectiveness of the regenerative brake to prevent generation of excessive braking force. This facilitates and smoothens vehicle speed control during following another vehicle.

(2) In approaching the proximity of the preceding vehicle, the braking force gain, which is a ratio of the amount of regenerated power to the operation amount of the accelerator pedal AP in the direction B, is decreased as the inter-vehicle distance decreases to appropriately obtain the above-described effect without causing the driver to feel uneasy.

(3) When the inter-vehicle distance is in the range close to the first threshold, the change rate of the braking force gain in accordance with the change in the inter-vehicle distance is continuously and gradually changed to moderately decrease braking force of the regenerative brake at the time of approaching another vehicle. This prevents intervention by the braking suppression control from causing the driver to feel uneasy and occupants to feel uncomfortable.

(4) The decrease in the braking force gain in the braking suppression control is changed in accordance with the vehicle speed so that when the traveling speed of the vehicle is high, decreasing the braking force by the braking suppression control is suppressed to prevent the vehicle from abnormally approaching the preceding vehicle and prevent the driver from feeling alarmed.

When the traveling speed of the vehicle is low, decreasing the braking force by the braking suppression control is promoted to facilitate following another vehicle in a traffic jam, for example.

(5) When the inter-vehicle distance becomes equal to or less than the first threshold while the braking operation is performed by the accelerator pedal AP, the decrease in the braking force gain by the braking suppression control is suppressed. Consequently, when the inter-vehicle distance becomes equal to or less than the braking suppression threshold while the deceleration operation is performed by returning the accelerator pedal AP, the driver can be prevented from feeling uneasy or alarmed due to the braking force abruptly lessened.

(6) When the preceding vehicle is in the decelerating state, the inter-vehicle distance to the host vehicle is highly likely to sharply decrease. Consequently, the braking suppression control is forbidden to obtain such braking force by the regenerative brake as to prevent rear-end collision and protect safety.

(7) When the inter-vehicle distance between the preceding vehicle and the host vehicle is decreasing at a predetermined speed or higher, the braking suppression control is forbidden to obtain such braking force by the regenerative brake as to prevent rear-end collision and protect safety.

(8) When the brake lamp of the preceding vehicle is lit, the preceding vehicle is highly likely to decelerate and cause the relative distance to the host vehicle to sharply decrease. Consequently, the braking suppression control is forbidden to obtain such braking force by the regenerative brake as to prevent rear-end collision and protect safety.

(9) When the traveling speed of the vehicle is high, intervention by the braking suppression control is performed with the inter-vehicle distance from the preceding vehicle being relatively long. This gives sufficient time and leeway for the driver to respond to a behavior of the preceding vehicle and maintains an inter-vehicle distance appropriate for the vehicle speed to facilitate following the preceding vehicle with improved drivability.

(10) In traveling a low-μ road surface of a wet road and an icebound and/or snowbound road, for example, the amount of regenerated power with respect to the operation amount of the accelerator pedal AP in the direction B is reduced to prevent irregular vehicle behaviors.

The decrease in the amount of regenerated power in performing the braking suppression control is reduced to prevent vehicle behaviors from differing from each other at the time of intervention and non-intervention by the braking suppression control and to prevent the driver from feeling uneasy.

(11) When the braking suppression control is performed, the display 140 notifies the driver and other occupants of intervention by the control so as to prevent the decrease in the braking force by the regenerative brake from causing the occupants to feel alarmed and uncertain.

(12) When the inter-vehicle distance to the preceding vehicle becomes equal to or less than the second threshold, the collision prevention control is started to increase the amount of regenerated power and decelerate the host vehicle so as to make the driver aware of danger and to reduce damage in case a collision occurs.

Second Embodiment

Next, a description will be made on a braking control apparatus according to a second embodiment of the disclosure.

In each of the following embodiments described below, the components common to those in the foregoing embodiment are denoted by the same reference numerals and signs to omit duplicate description, and the differences will be mainly described.

Figure 7:
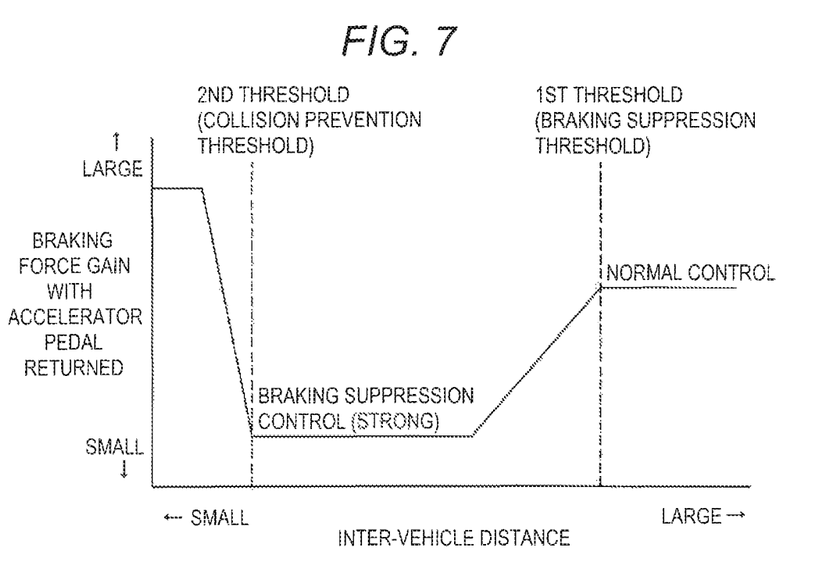
FIG. 7 is a graph schematically illustrating a correlation between an inter-vehicle distance to a preceding vehicle and a braking force gain in a braking control apparatus according to a second embodiment.

FIG. 7 is a graph schematically illustrating a correlation between the inter-vehicle distance to the preceding vehicle and the braking force gain in the braking control apparatus according to the second embodiment.

As illustrated in FIG. 7, according to the second embodiment, when the inter-vehicle distance becomes equal to or less than the first threshold, the braking force gain is immediately decreased at a predetermined change rate in proportion to a decrease in the inter-vehicle distance.

The second embodiment described above produces substantially the same effects as the first embodiment (except for the effect described in item 3). In addition, since decreasing the braking force gain is immediately started when the inter-vehicle distance becomes equal to or less than the first threshold, a notable change in braking force at the time of intervention by the braking suppression control enables the driver to feel decelerating to intuitively recognize that the braking suppression control has intervened.

Third Embodiment

Next, a description will be made on a braking control apparatus according to a third embodiment of the disclosure.

Figure 8:
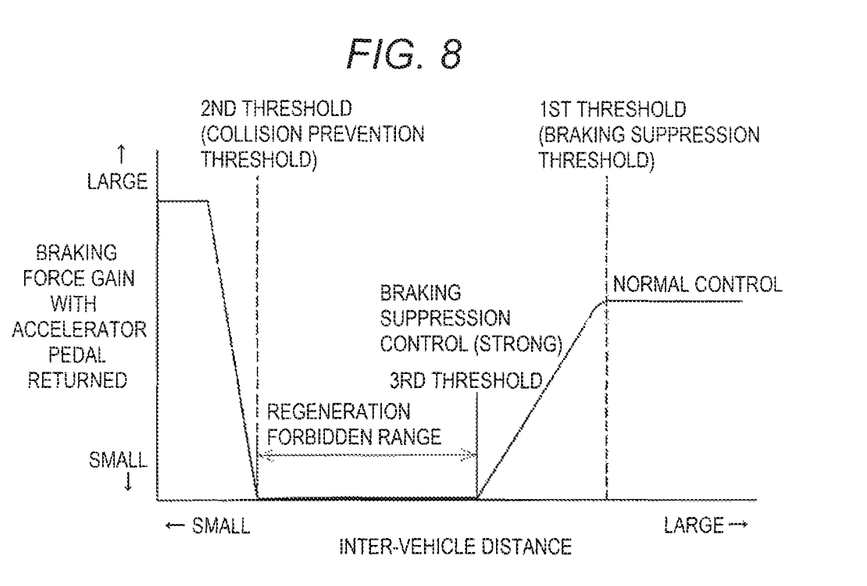
FIG. 8 is a graph schematically illustrating a correlation between an inter-vehicle distance to a preceding vehicle and a braking force gain in a braking control apparatus according to a third embodiment.

FIG. 8 is a graph schematically illustrating a correlation between the inter-vehicle distance to the preceding vehicle and the braking force gain in the braking control apparatus according to the third embodiment.

According to the third embodiment, the lower limit value of the braking force gain in the braking suppression control is set at 0.

That is, according to the third embodiment, a third threshold is set between the first threshold and the second threshold, and a regeneration forbidden range where no power regeneration is performed is set in a range of the inter-vehicle distance from the third threshold to the second threshold.

The third embodiment described above can produce substantially the same effects as the first embodiment.

Modifications

The above-described embodiments of the disclosure are not to be construed in a limiting sense, and various modifications and changes are possible and would also fall within the technical scope of the disclosure.

(1) Configurations of the vehicle and the braking control apparatus are not limited to those described in each of the foregoing embodiments and can be changed as appropriate.

For example, in each of the embodiments, the vehicle is an electric vehicle (pure EV) in which the electric motor serves as a single traveling power source powered by the secondary battery. The disclosure is applicable to various kinds of electric vehicles, such as engine electric hybrid vehicles (disregarding kinds of hybrid vehicles such as series hybrid vehicles and parallel hybrid vehicles, and including hybrid vehicles with a plug-in charging function) including a rotary electric machine capable of power regeneration, and fuel cell automobiles.

A driving method and a configuration of powertrain are not particularly limited.

(2) In each of the embodiments, when the inter-vehicle distance to the preceding vehicle becomes less than the braking suppression threshold while the acceleration and deceleration operation member is operated to the deceleration side (while the accelerator pedal is returned from the neutral position), the decrease in the braking force gain in the braking suppression control is suppressed to weaken the braking suppression control. However, in such a case, the braking suppression control may be forbidden and normal control may be continued.

(3) In each of the embodiments, the braking suppression control is forbidden in accordance with, for example, deceleration of the preceding vehicle, a decrease in the inter-vehicle distance, and lighting of the brake lamp of the preceding vehicle, and normal control is continued. However, in such a case, the braking suppression control may be performed while the decrease in the braking force gain is suppressed (while the decrease in the amount of regenerated power is reduced).

(4) In each of the embodiments, the decrease pattern of the braking force gain in accordance with the decrease in the inter-vehicle distance is merely an example, which is not to be construed in a limiting sense and may be changed as appropriate.

For example, in accordance with the decrease in the inter-vehicle distance, the braking force gain may be step-wise decreased.

(5) In each of the embodiments, the amount of operation of the acceleration and deceleration operation member (accelerator pedal) from the neutral position to the deceleration side is multiplied by the braking force gain to control the braking force of the regenerative brake and the deceleration. Instead of the braking suppression control of decreasing the braking force gain, braking force and deceleration may be directly limited to perform the braking suppression control.

Alternatively, the braking suppression control may be performed when the acceleration and deceleration operation member is at an end on the most decelerated side in the movable range of the acceleration and deceleration operation member (e.g., when the accelerator pedal is completely returned). In each of the embodiments, the low-μ state is detected based on the captured image of a front view from the host vehicle. However, this is not to be construed in a limiting sense. Other methods may be adopted to estimate a road surface μ.

For example, various parameters, such as a steering angle, a self-aligning torque, a vehicle speed, a vehicle body acceleration, and a yaw rate, may be compared with values calculated using a vehicle operation model so as to estimate the low-μ state.

According to the embodiments of the disclosure, when the inter-vehicle distance between the host vehicle and the preceding other vehicle becomes equal to or less than the braking suppression threshold, the amount of power regenerated in accordance with the amount of operation of the acceleration and deceleration control member in the second direction is reduced to lessen effectiveness of the regenerative brake to prevent generation of excessive braking force. This facilitates and smooths vehicle speed control during following the other vehicle.

In approaching the proximity of the other vehicle, the ratio of the amount of regenerated power to the operation amount of the acceleration and deceleration operation member in the second direction, that is, the gain of braking force with respect to the operation amount is decreased as the relative distance decreases so as to appropriately obtain the above-described effects without causing the driver to feel uneasy.

The braking force of the regenerative brake in approaching the proximity of the other vehicle is moderately decreased to prevent the driver from feeling uneasy in response to intervention by the braking suppression control.

A notable change in the braking force at the time of intervention by the braking suppression control enables the driver to feel decelerating to recognize that the braking suppression control has intervened.

When the traveling speed of the vehicle is high, decreasing the braking force by the braking suppression control is suppressed to prevent the vehicle from abnormally approaching the preceding vehicle and prevent the driver from feeling alarmed.

When the traveling speed of the vehicle is low, decreasing the braking force by the braking suppression control is promoted to facilitate following another vehicle in a traffic jam, for example.

When the inter-vehicle distance becomes equal to or less than the braking suppression threshold with the driver performing deceleration operation using the acceleration and deceleration operation member, the driver can be prevented from feeling uneasy or alarmed due to the decrease in the braking force.

When the other vehicle is in the decelerating state, the other vehicle is highly likely to decelerate and cause the relative distance to the host vehicle to sharply decrease. Consequently, the braking suppression control is limited or forbidden to obtain such braking force by the regenerative brake as to prevent rear-end collision and protect safety.

In accordance with an increase in the relative speed of the other vehicle in the direction to approach the host vehicle, the braking suppression control is limited or forbidden to obtain such braking force by the regenerative brake as to prevent rear-end collision and protect safety.

When the brake lamp of the other vehicle is lit, the other vehicle is highly likely to decelerate and cause the relative distance to the host vehicle to sharply decrease. Consequently, the braking suppression control is limited or forbidden to obtain such braking force by the regenerative brake as to prevent rear-end collision and protect safety.

When the traveling speed of the vehicle is high, intervention by the braking suppression control is performed with the relative distance from the other vehicle being relatively long. This gives sufficient time and leeway for the driver to respond to a behavior of the other vehicle and maintains an inter-vehicle distance appropriate for the vehicle speed so as to facilitate following the preceding vehicle with improved drivability.

When a friction coefficient μ of a road surface is relatively low, as in the case of a wet road, an icebound and/or snowbound road, an unpaved road, and a muddy road, for example, the amount of regenerated power with respect to the amount of operation of the acceleration and deceleration operation member in the second direction is reduced to prevent irregular vehicle behaviors.

The decrease in the amount of regenerated power in performing the braking suppression control is reduced to prevent vehicle behaviors from differing from each other at the time of intervention and non-intervention by the braking suppression control and to prevent the driver from feeling uneasy.

The driver and other occupants are made to recognize intervention by the braking suppression control to prevent the decrease in the braking force by the regenerative brake from causing the occupants to feel alarmed and uncertain.

When the inter-vehicle distance from the other vehicle becomes equal to or less than the collision prevention threshold, the amount of regenerated power is increased, and the vehicle is decelerated to make the driver aware of danger and to reduce damage in case a collision occurs.

As has been described heretofore, the embodiments of the disclosure provide the braking control apparatus for a vehicle that performs acceleration operation and deceleration operation using the single operation member. The braking control apparatus facilitates following travel of the vehicle behind the other vehicle.

The invention claimed is:

1. A braking control apparatus to be installed in an electric vehicle, the apparatus comprising:
an acceleration and deceleration operation member configured to
receive an acceleration request in accordance with an operation amount of the acceleration and deceleration operation member in a first direction from a neutral position, and
receive a deceleration request in accordance with an operation amount of the acceleration and deceleration operation member in a second direction from the neutral position;
a controller configured to control an amount of power regenerated by a rotary electric machine driven by wheels in accordance with the operation amount of the acceleration and deceleration operation member in the second direction; and
a recognizer configured to recognize a preceding vehicle traveling ahead of the electric vehicle, wherein
upon detection of the preceding vehicle at a relative distance from the electric vehicle that is equal to or less than a braking suppression threshold, the controller selects an operation from (i) or (ii),
with (i) being braking suppression control to decrease the amount of power regenerated in accordance with the operation amount of the acceleration and deceleration operation member in the second direction, and wherein
(ii) involves the recognizer detecting a decelerating state of the preceding vehicle, and the controller either forbidding braking suppression control or allowing braking suppression control but at a reduced suppression level than that designed for use in (i).

2. The braking control apparatus according to claim 1, wherein in performing the braking suppression control, the controller decreases a gain of the amount of regenerated power with respect to the operation amount of the acceleration and deceleration operation member in the second direction in accordance with a decrease in the relative distance.

3. The braking control apparatus according to claim 2, wherein when the relative distance lessens after the electric vehicle reaches the braking suppression threshold, the controller continuously and gradually changes a decrease in the amount of regenerated power in accordance with the relative distance in the braking suppression control.

4. The braking control apparatus according to claim 2, wherein the controller is configured to set a decrease in the amount of regenerated power in accordance with the relative distance in the braking suppression control so as to be in proportion to the decrease in the relative distance.

5. The braking control apparatus according to claim 1, wherein the controller is configured to reduce a decrease in the amount of regenerated power in the braking suppression control as a traveling speed of the electric vehicle increases.

6. The braking control apparatus according to claim 1, wherein
when the relative distance to the preceding vehicle changes from being longer than the braking suppression threshold to being equal to or less than the braking suppression threshold, the controller sets either a first suppression mode or a second suppression mode, with the second suppression mode being implemented when the acceleration and deceleration operation member is not operated in the second direction from the neutral position, and wherein the first suppression mode is implemented when the acceleration and deceleration operation member is operating in the second direction from the neutral position, and wherein in the first suppression mode there is implemented less of a decrease in the amount of regenerated power in the braking suppression control as compared to that of the second suppression mode which features a greater or stronger decrease in the amount of regenerated power in the braking suppression control as that in the first suppression mode.

7. A braking control apparatus to be installed in an electric vehicle, the apparatus comprising:
an acceleration and deceleration operation member configured to
receive an acceleration request in accordance with an operation amount of the acceleration and deceleration operation member in a first direction from a neutral position, and
receive a deceleration request in accordance with an operation amount of the acceleration and deceleration operation member in a second direction from the neutral position;
a controller configured to control an amount of power regenerated by a rotary electric machine driven by wheels in accordance with the operation amount of the acceleration and deceleration operation member in the second direction; and
a recognizer configured to recognize a preceding vehicle traveling ahead of the electric vehicle, wherein
upon detection of the preceding vehicle at a relative distance from the electric vehicle that is equal to or less than a braking suppression threshold, the controller selects an operation from (i) or (ii),
with (i) being braking suppression control to decrease the amount of power regenerated in accordance with the operation amount of the acceleration and deceleration operation member in the second direction, and wherein
(ii) involves the recognizer being configured to detect a relative speed of the preceding vehicle relative to the electric vehicle, and, upon a determination of an increase of the relative speed of the preceding vehicle in a direction to approach the electric vehicle, the controller either forbids braking suppression control or allows braking suppression control but at a reduced suppression level than that designed for use in (i).

8. The braking control apparatus according to claim 1, further comprising:
a brake lamp detector configured, upon the electric vehicle reaching or passing the braking suppression threshold, to detect whether a brake lamp of the preceding vehicle is lit, and wherein
upon detection of a lit brake lamp, the controller either forbids braking suppression control or allows braking suppression control but at a reduced suppression level than that designed for use in (i).

9. The braking control apparatus according to claim 1, wherein the controller is configured to increase the braking suppression threshold as a traveling speed of the electric vehicle increases.

10. The braking control apparatus according to claim 1, further comprising:
a detector configured to detect a state of a road surface, wherein
upon detection of the road surface being in a state of a low friction coefficient, the controller
decreases the amount of power regenerated in accordance with the operation amount of the acceleration and deceleration operation member in the second direction, and
reduces a decrease in the amount of regenerated power in performing the braking suppression control.

11. The braking control apparatus according to claim 1, further comprising:
a notifier configured to notify an occupant of intervention by the braking suppression control in performing the braking suppression control.

12. A braking control apparatus to be installed in an electric vehicle, the apparatus comprising:
an acceleration and deceleration operation member configured to
receive an acceleration request in accordance with an operation amount of the acceleration and deceleration operation member in a first direction from a neutral position, and
receive a deceleration request in accordance with an operation amount of the acceleration and deceleration operation member in a second direction from the neutral position;
a controller configured to control an amount of power regenerated by a rotary electric machine driven by wheels in accordance with the operation amount of the acceleration and deceleration operation member in the second direction; and
a recognizer configured to recognize a preceding vehicle traveling ahead of the electric vehicle, wherein
upon detection of the preceding vehicle at a relative distance from the electric vehicle that is equal to or less than a braking suppression threshold, the controller performs braking suppression control to decrease the amount of power regenerated in accordance with the operation amount of the acceleration and deceleration operation member in the second direction, and wherein
when the relative distance to the preceding vehicle becomes equal to or less than a collision prevention threshold smaller than the braking suppression threshold, the controller increases the amount of regenerated power.

13. A braking control apparatus for an electric vehicle including an electric motor, the apparatus comprising:
a pedal configured to be operated by a driver of the electric vehicle;
a sensor configured to detect
a first operation amount of the pedal in a first direction from a reference position, or
a second operation amount of the pedal in a second direction other than the first direction from the reference position;
a controller configured to be coupled with the sensor, and
when detecting the first operation amount, to control an amount of electric power regenerated by the electric motor to cause the electric motor to provide a first regenerative braking force in accordance with the first operation amount; and
when detecting the second operation amount, cause the electric motor to generate torque for driving the electric vehicle in accordance with the second operation amount, and
an environment recognition unit configured to detect a relative distance from the electric vehicle to a preceding vehicle traveling ahead of the electric vehicle by using at least one of a radar or one or more cameras, wherein
the controller is configured to suppress a regenerative braking force to a second regenerative braking force less than the first regenerative braking force when detecting (i) the relative distance is within a first threshold and (ii) not detecting the preceding vehicle is decelerating and the relative distance is decreasing.

14. The braking control apparatus according to claim 13, wherein the controller is configured to increase a regenerative braking force to a third regenerative braking force more than the first and second regenerative braking forces, when detecting the relative distance is equal to or less than a second threshold less than the first threshold.

15. The braking control apparatus according to claim 13, wherein the controller is configured to suppress a regenerative braking force to a fourth regenerative braking force between the second regenerative braking force and the first regenerative braking force when detecting an increase of the first operation amount.

16. The braking control apparatus according to claim 13, wherein the first and second thresholds are increased as speed of the electric vehicle increases.

* * * * *